(12) United States Patent
Killingbeck

(10) Patent No.: US 12,377,687 B2
(45) Date of Patent: Aug. 5, 2025

(54) TYRE

(71) Applicant: Rise Technologies Limited, Norwich (GB)

(72) Inventor: Bernard Killingbeck, Fritton (GB)

(73) Assignee: Rise Technologies Limited, Norwich (GB)

( * ) Notice: Subject to any disclaimer, the term of this patent is extended or adjusted under 35 U.S.C. 154(b) by 370 days.

(21) Appl. No.: 17/794,794

(22) PCT Filed: Jan. 21, 2021

(86) PCT No.: PCT/EP2021/051322
§ 371 (c)(1),
(2) Date: Jul. 22, 2022

(87) PCT Pub. No.: WO2021/148529
PCT Pub. Date: Jul. 29, 2021

(65) Prior Publication Data
US 2023/0072753 A1    Mar. 9, 2023

(30) Foreign Application Priority Data
Jan. 24, 2020 (GB) .................................. 2001022

(51) Int. Cl.
| | |
|---|---|
| B60C 11/12 | (2006.01) |
| B60C 3/04 | (2006.01) |
| B60C 7/10 | (2006.01) |
| B60C 11/03 | (2006.01) |
| B60C 11/11 | (2006.01) |
| B60C 11/13 | (2006.01) |

(52) U.S. Cl.
CPC ............ B60C 11/1259 (2013.01); B60C 3/04 (2013.01); B60C 7/102 (2013.01); B60C 7/107 (2021.08); B60C 11/0306 (2013.01); B60C 11/11 (2013.01); B60C 11/1376 (2013.01); B60C 2011/0355 (2013.01); B60C 2011/0367 (2013.01); B60C 2011/1245 (2013.01); B60C 2200/04 (2013.01)

(58) Field of Classification Search
CPC ............. B60C 7/102; B60C 2011/1245; B60C 11/1376; B60C 11/1384; B60C 11/1392
See application file for complete search history.

(56) References Cited

U.S. PATENT DOCUMENTS

| | | |
|---|---|---|
| 2,048,635 A | 7/1936 | Kraft |
| 3,805,865 A | 4/1974 | Price |
| (Continued) | | |

FOREIGN PATENT DOCUMENTS

| | | |
|---|---|---|
| CN | 206598673 U | 10/2017 |
| CN | 109177647 A | 1/2019 |
| (Continued) | | |

OTHER PUBLICATIONS

Machine Translation: JP-2007137207-A, Seto H, (Year: 2025).*
(Continued)

*Primary Examiner* — Kendra Ly
(74) *Attorney, Agent, or Firm* — Erise IP, P.A.

(57) ABSTRACT

A tyre comprising an adaptive tread, the adaptive tread comprising a plurality of surface sections, wherein each surface section can move without deformation relative to the other surface sections to form a tread pattern.

18 Claims, 6 Drawing Sheets

(56) References Cited

U.S. PATENT DOCUMENTS

| | | | | |
|---|---|---|---|---|
| 4,722,378 A | * | 2/1988 | Carolla | B60C 11/0302 |
| | | | | 152/209.15 |
| 5,388,623 A | * | 2/1995 | Homma | A63C 17/045 |
| | | | | 152/12 |
| 2009/0211677 A1 | * | 8/2009 | Palinkas | B60C 7/24 |
| | | | | 157/1.1 |
| 2012/0038206 A1 | | 2/2012 | Chadwick et al. | |
| 2013/0248067 A1 | * | 9/2013 | Delfino | B60C 7/16 |
| | | | | 152/1 |
| 2017/0368879 A1 | * | 12/2017 | Lettieri | B60C 7/22 |
| 2018/0029422 A1 | * | 2/2018 | Thompson | B60C 9/1807 |
| 2019/0143756 A1 | | 5/2019 | Smith | |

FOREIGN PATENT DOCUMENTS

| | | |
|---|---|---|
| CN | 209600177 U | 11/2019 |
| CN | 111055635 | 4/2020 |
| CN | 108068548 B | 8/2020 |
| CN | 211764709 U | 10/2020 |
| DE | 102015000529 A1 | 7/2016 |
| EP | 0668173 A1 | 8/1995 |
| EP | 1902866 A1 | 3/2008 |
| EP | 2418098 A2 | 2/2012 |
| GB | 191224552 A | 5/1913 |
| GB | 250512 A | 4/1926 |
| GB | 431516 A | 7/1935 |
| GB | 518601 A | 3/1940 |
| GB | 844817 A | 8/1960 |
| GB | 2467956 A | 8/2010 |
| JP | 02189205 A | 7/1990 |
| JP | 05147410 A | 6/1993 |
| JP | 05319030 A | 12/1993 |
| JP | 10244813 A | 9/1998 |
| JP | 2002234315 A | 8/2002 |
| JP | 2003072315 A | 3/2003 |
| JP | 2003112504 | 4/2003 |
| JP | 2007137207 A * | 6/2007 |
| WO | 8302429 A1 | 7/1983 |
| WO | 2007003865 A1 | 1/2007 |
| WO | 2010087349 A1 | 8/2010 |
| WO | 2016104663 A1 | 6/2016 |
| WO | 2019087218 A1 | 5/2019 |
| WO | 2019180750 A1 | 9/2019 |

OTHER PUBLICATIONS

Great Britain Patent Application 2001022.9 Combined Search and Examination Report issued May 4, 2020.

Great Britain Patent Application 2001022.9 Search Report issued Mar. 25, 2021.

PCT Application PCT/EP2021/051322, Notification of Transmittal International Search Report and Written Opinion of the Internal Search Authority, or the Declaration, Apr. 6, 2021.

Hankook Tires "Innovatives Design" Dec. 31, 2016 https://www.hankooktire.com/de/about-hankook-tire/technology/design-innovation/design-project/2016.html, The Wayback Machine, Jul. 21, 2022.

Hankook Tires "Innovatives Design the Way to the Future" Oct. 30, 2012 https://www.hankooktire.com/de/about-hankook-tire/technology/design-innovation/design-project/2012.html, The Wayback Machine, Jul. 21, 2022.

Japanese Patent Application 2022-544372 Notification of Reasons for Refusal issued Dec. 11, 2024.

* cited by examiner

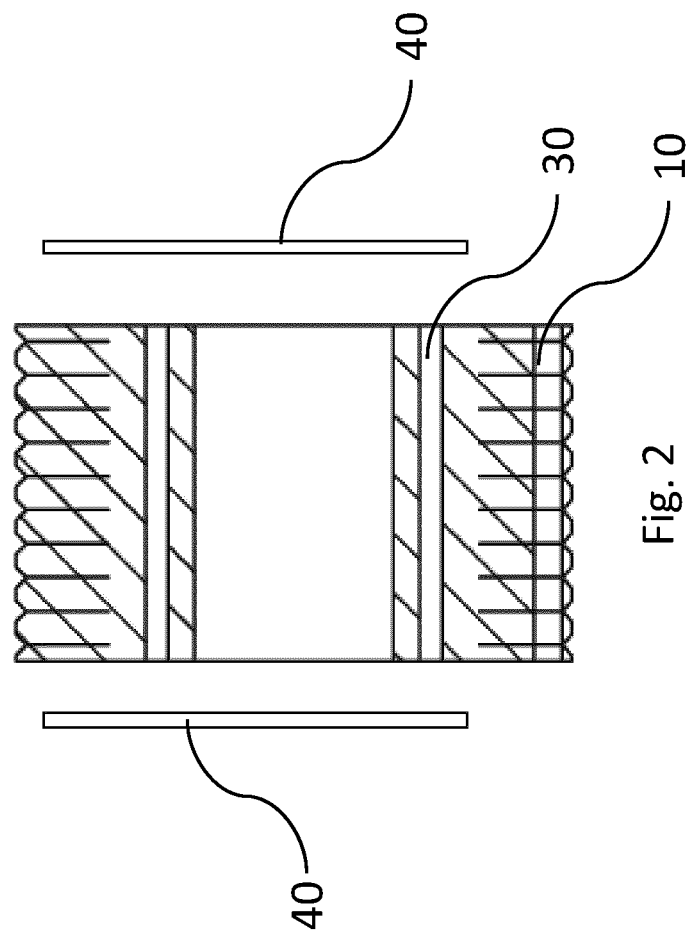

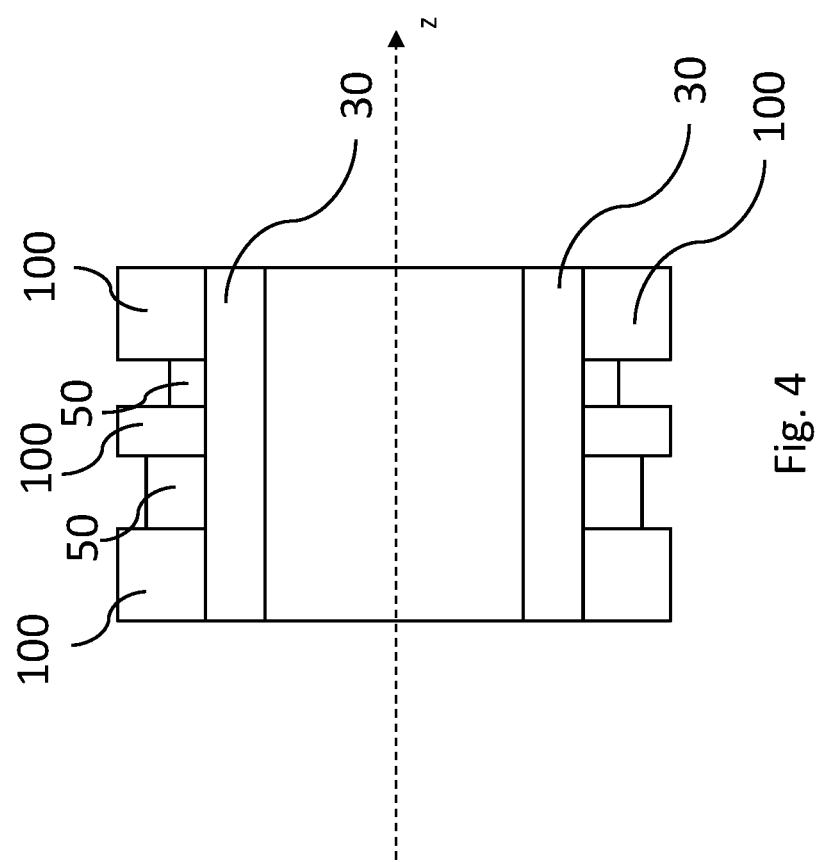

TYRE

RELATED APPLICATIONS

The present application is a national stage application under 35 U.S.C. § 371 of International Application No. PCT/EP2021/051322, filed 21 Jan. 2021, which claims priority to Great Britain Patent Application No. 2001022.9, filed 24 Jan. 2020. The above referenced applications are hereby incorporated by reference in their entirety.

TECHNICAL FIELD

The present disclosure relates to tyres for vehicles such as cars.

BACKGROUND

Conventional tyres comprise a rubber surface including a tread pattern of grooves, and an inner tube filled under pressure with air. The rubber surface is held against a ground surface by the weight of the vehicle and provides traction against the ground surface; the grooves of the tread pattern are provided to expel water from between the tyre and the ground surface; and the inner tube is provided to increase rigidity of the tyre and to absorb shocks while maintaining traction.

These conventional tyres have several limitations.

Traction between the tyre and the ground surface is limited, and some wear occurs as the rubber surface slips or skids on the ground surface.

While the rubber surface can stretch and deform to some extent, the grooves of the tread pattern provide a fixed reduction in the contact area between the tyre and the ground surface, and thus a reduction in traction. Thus tyre designers have to compromise between the ability to expel water and the maximum traction. This leads to different designs specialised for different conditions, such as slick tyres (with smooth surfaces) for dry conditions and wet tyres (with extensive grooves) for wet conditions. With such specialisations, it is not desirable (and may even be dangerous) to use the same tyres in different conditions.

Additionally, the rubber surface is typically fairly thin and soft, and is at risk of piercing through to the inner tube. When the inner tube is pierced, tyre pressure is lost, leading to at least reduced traction and control of the vehicle, and potentially to a crash.

These issues are amplified in electric vehicles, because electric engines typically apply much more torque than a combustion engine, and electric vehicles are also typically heavier, meaning that traction on tyres, and the associated wear as the tyres slip or stretch, is significantly increased (by up to 3 times in some cases). The lifetime of tyres used with electric vehicles is correspondingly reduced (for example from 30,000 miles to 10,000 miles) and, given the desired environmental friendliness of electric vehicles, this more frequent need to replace and dispose of tyres may be seen as a problem.

Accordingly, it is desirable to provide a tyre which can address at least some of the above issues, by providing improved traction, reduced wear, increased adaptability to different environmental conditions and/or puncture resistance.

SUMMARY

According to a first aspect, the present disclosure provides a tyre comprising an adaptive tread, the adaptive tread comprising a plurality of surface sections, wherein each surface section can move without deformation relative to the other surface sections to form a tread pattern.

By providing a tread which can change its tread pattern without deformation, contact area between the tyre surface and the ground surface can be changed beyond the stretching and deformation limits of a conventional tyre tread. This can improve traction, reduce wear and increase adaptability, by enabling the tread to conform with a ground surface and also expel water when water is present.

Optionally, the tyre comprises an inner body and protrusions, the protrusions being arranged around a circumference of the inner body and extending radially outward from the inner body, wherein the surface sections are the radially-distal ends of the protrusions.

By providing the surface sections as the ends of protrusions, relative motion is enabled passively without deforming the surface section by instead deforming the protrusion along its radial length. This is a relatively straightforward solution which can be moulded and/or cut using conventional tyre materials.

Optionally, the protrusions have a length of at least 10% of a radius of the tyre.

By providing protrusions of a length which is a substantial proportion of the tyre radius, the chance of the tyre being pierced all the way through the tread is reduced, and the risk of puncture is reduced.

Optionally, the protrusions are arranged in rows extending along an axial width of the tyre. In other words, the rows are perpendicular to a direction of rotation of the tyre.

By providing rows extending along the axial width, the protrusions can deform perpendicular to the rows, i.e. along the direction of rotation of the tyre. This enables the rows to absorb smaller variations in torque and reduce wear on the surface sections.

Optionally, each row comprises a plurality of adjacent protrusions.

By providing rows of adjacent protrusions, a grid-like arrangement of protrusions is formed, and the protrusions can deform either or both of along the direction of rotation and perpendicular to the direction of rotation. This enables better adaptation of the tread to an uneven ground surface, and improved traction.

Optionally, the rows are arranged adjacent to each other around the whole circumference of the tyre.

The protrusions provide some of the above-identified advantages even when used on only part of the tread. However, it is desirable that the tread is consistent in the circumferential direction around the tyre, so that the forces on the axle are not dependent upon the angular position of the wheel.

Optionally, the surface sections may be raised in a middle portion relative to an edge portion, for directing water or loose material towards the edge portion.

By directing water or loose material towards edges of the surface sections, the water or loose material is positioned to apply a force for moving the surface sections apart, to adapt the tread pattern and produce one or more grooves.

According to a second aspect, the present disclosure provides a tyre comprising a tread layer, a wheel interface and a linking layer arranged to link the wheel interface to the tread layer, wherein the linking layer is formed from a super elastic material and comprises a cavity.

The super elastic linking layer replaces a conventional inner tube, and enables a more solid connection between the tread and the wheel interface. This improves torque transfer to the tread and reduces the elastic fatigue associated with the side wall of a conventional tyre.

Optionally for the second aspect, the tyre further comprises a compressible gas-filled cushion adapted to fit the cavity.

Providing a gas-filled cushion has the advantage of reducing wear on the cavity, by preventing opposing sides of the cavity from rubbing against each other.

Optionally for the second aspect, the cavity is in fluid connection with an external environment of the tyre.

Providing a fluid connection means that there is no pressure difference between the cavity and the external environment and, in the event that the tyre is pierced, there is no sudden change in the behaviour of the tyre. This reduces the risk of a more serious accident due to the piercing.

Optionally for the second aspect, the linking layer comprises a plurality of cavities distributed around a circumference of the tyre.

By distributing cavities around the circumference, the uniformity of the linking layer as the tyre rolls is improved, and the tyre can roll more smoothly.

Optionally for the second aspect, the tyre further comprises a connecting wall fitted to an axial end of the tyre, the connecting wall covering the linking layer.

The linking layer, which is super elastic, may be less robust than the tread. Accordingly, by covering the linking layer, the connecting wall increases the durability and lifetime of the tyre.

As a further optional feature, the cavity may extend to an axial end of the tyre and the connecting wall may cover the cavity.

The connecting wall can prevent debris or water from entering the cavity in the linking layer, reducing a risk of debris increasing friction in the cavity. Additionally, if the cavity has a gas-filled cushion, the connecting wall reduces the risk of the cushion escaping from the tyre, or debris damaging the cushion.

Optionally for the second aspect, the connecting wall may be detachable from the tyre.

A detachable connecting wall has the advantage that the cavity can be easily cleaned and/or the cushion replaced.

Optionally, for the second aspect, the connecting wall may comprise a mounting portion for mounting the tyre on a wheel hub.

By enabling the connecting wall to be explicitly attached to a wheel hub, the risk of the tyre detaching from the wheel in the event of a sideways impact is reduced, and safety is increased.

Optionally for the second aspect, the tread layer comprises a plurality of disc sections arranged around the linking layer and along a rotation axis of the tyre.

By providing a tread layer comprising a plurality of sections, tyres of different widths can be assembled by stacking different quantities of a common pre-fabricated disc section, or complex tread patterns can be assembled by stacking different pre-fabricated disc sections.

As a further optional feature, a spacer is arranged between a pair of adjacent disc sections.

By providing a spacer between a pair of adjacent disc sections (or regularly between pairs of adjacent disc sections), a gap can be provided between disc sections of the tread layer, wherein the gap can be configured to improve traction, cooling or water removal in the tread layer.

The features of the first aspect may be combined with the second aspect, as in the attached claims.

According to a third aspect, the present disclosure provides a method for assembling a plurality of tyres according to the second aspect. The method comprises:
  manufacturing a plurality of linking layers arranged to link a wheel interface to a tread layer, wherein the linking layer is formed from a super elastic material and comprises a cavity;
  manufacturing a plurality of tread layers; and
  assembling a plurality of tyres by arranging a tread layer of the plurality of tread layers around a linking layer of the plurality of linking layers.

In a conventional method of manufacturing a tyre, a tread layer is formed and cured directly onto an inner carcass. Similarly, in a conventional method of re-treading a tyre, a new tread layer is cured directly onto a recycled carcass, This means that curing of the tread, a slow stage of production, can only be performed as a later stage of assembling the tyre and the curing is complicated by the presence of the carcass. On the other hand, according to the invention, a tread layer can be fully formed before it is assembled with a linking layer.

According to a fourth aspect, the present disclosure provides an electric vehicle comprising a tyre according to the first aspect or the second aspect.

As mentioned above, tyres in electric vehicles experience high torque and thus increased wear. Accordingly, electric vehicles particularly benefit from use of the tyre of the first aspect or the second aspect.

Nevertheless, a tyre of the first aspect or the second aspect may be used with a combustion engine.

BRIEF DESCRIPTION OF THE DRAWINGS

FIG. 2 is a schematic cross-sectional view of a tyre according to another embodiment;
FIG. 4 is a schematic cross-sectional view of a tyre according to a fourth embodiment.

DETAILED DESCRIPTION

FIGS. 1A to 1D are schematic illustrations of a tyre 1 according to an embodiment, from different viewpoints. The tyre 1 has a loosely cylindrical geometry and can be described by reference to an axis around which it is configured to rotate, labelled z in FIGS. 1A to 1D. The axial direction is parallel to the z axis, the radial direction is toward or away from the z axis, and the circumferential direction is around the z axis.

As shown in FIGS. 1A to 1D, around the z-axis, the tyre 1 comprises a tread layer 10, a wheel interface 20 and a linking layer 30.

Figure 1A:
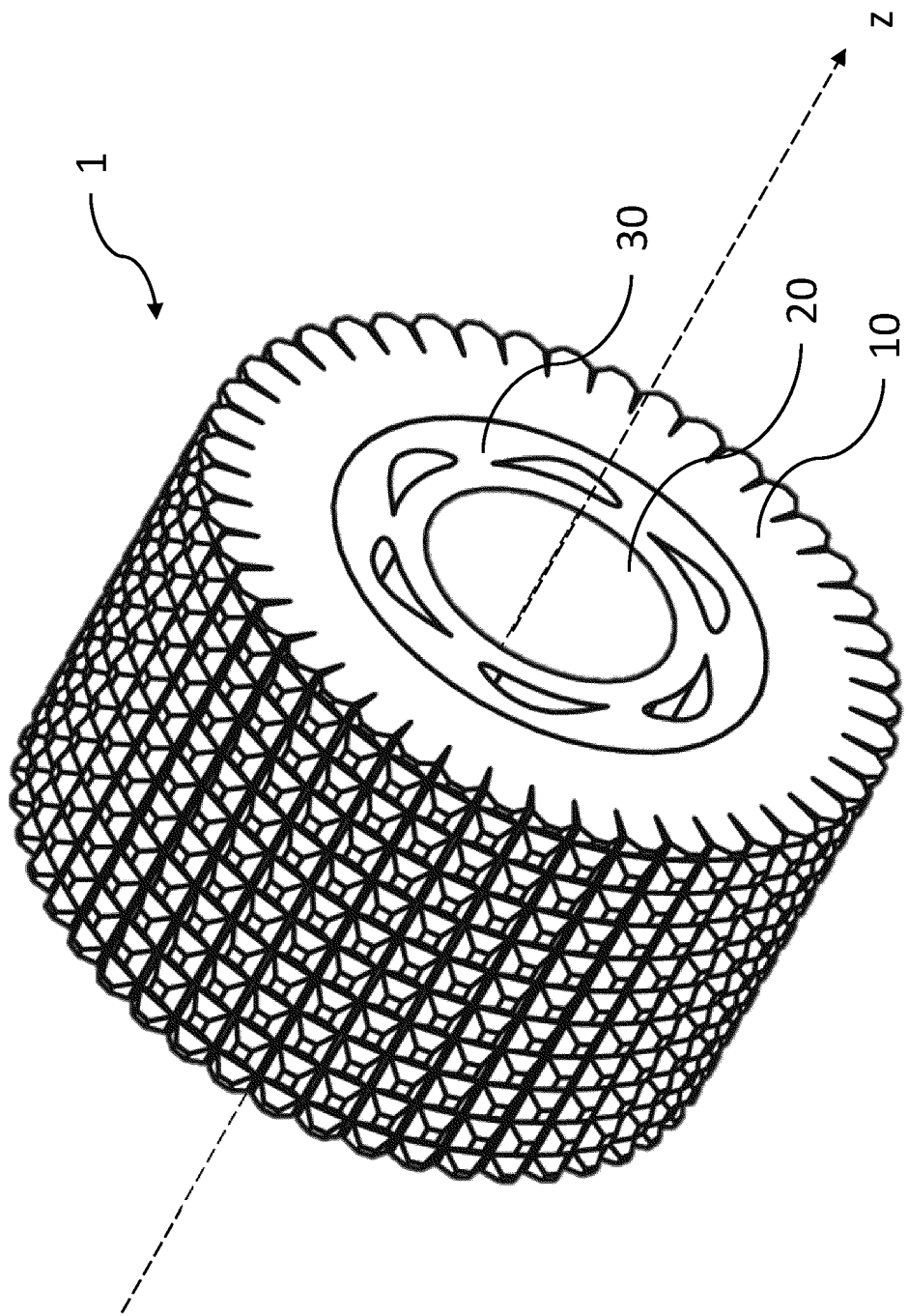
FIG. 1A is a schematic perspective view of a tyre according to an embodiment.
Figure 1C:
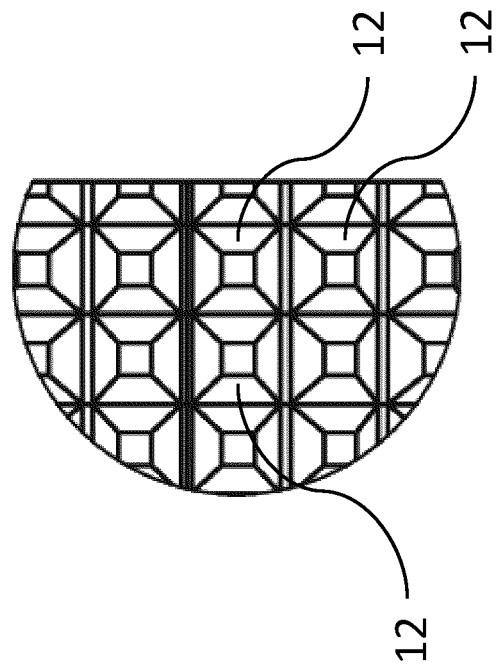
FIG. 1C is a schematic detail view of surface sections of the tyre.
Figure 1B:
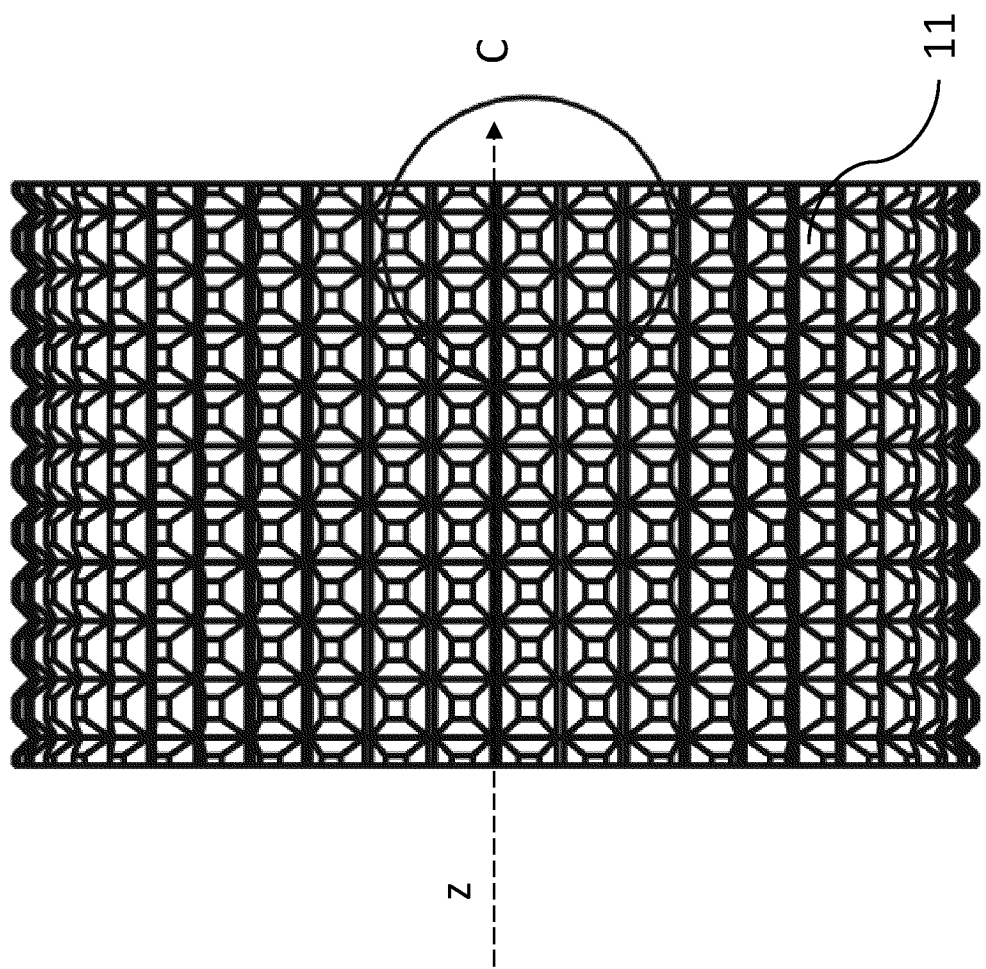
FIG. 1B is a schematic front view of the tyre.

Referring to FIG. 1B, the tread layer 10 comprises an adaptive tread 11 forming its outer surface for the tyre to roll on a ground surface. The adaptive tread 11 comprises a plurality of surface sections 12, as shown in greater detail in FIG. 1C which is an enlarged view of the circle C that is labelled in FIG. 1B.

Each of the surface sections 12 may be flat or may have a partial tread pattern.

In the example shown in FIGS. 1B and 1C, each surface section 12 has a partial tread pattern which comprises a raised central section surrounded by a recessed outer section. The central section may, for example, be square, round, oval diamond etc. This particular partial tread pattern directs loose material or water on the ground surface towards the joins between the surface sections 12 such that the loose material or water applies a force to cause the surface sections 12 to move apart, without requiring deformation of the individual surface sections, by the mechanism described later. The difference between the raised and recessed sections may be small, and may simply be enough to bias loose material or water towards the joins between the surface sections 12.

The surface sections 12 are arranged in a grid-like arrangement to form the overall tread surface. In an unstressed state (i.e. no force applied), the surface sections 12 may be immediately adjacent in the grid (as shown in FIGS. 1B and 1C). Alternatively, in the unstressed state, the "joins" between surface sections 12 may contain gaps such that there are expandable and/or compressible grooves between the surface sections 12. By providing gaps in the unstressed state, the minimum force required to move an individual surface section 12 may be reduced, as it can initially move independently of adjacent surface sections 12 in the grid.

Figure 1E:
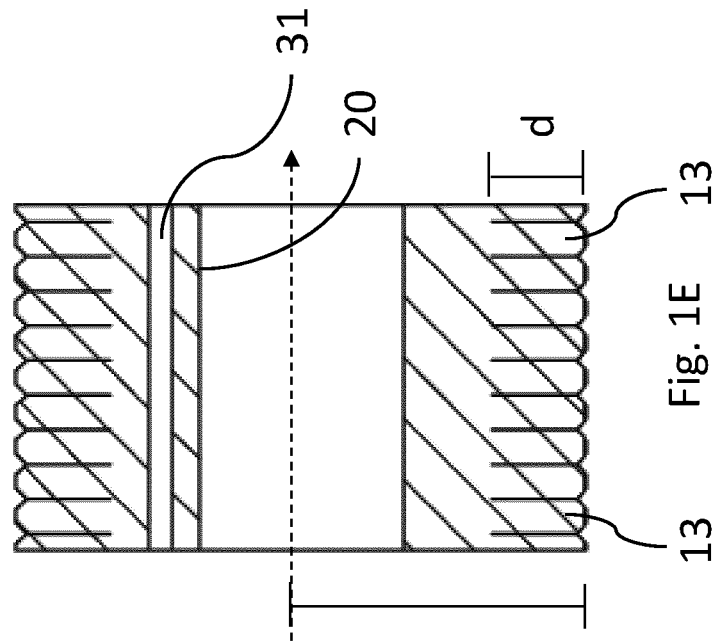
FIG. 1E is a schematic cross-sectional view of the tyre.
Figure 1D:
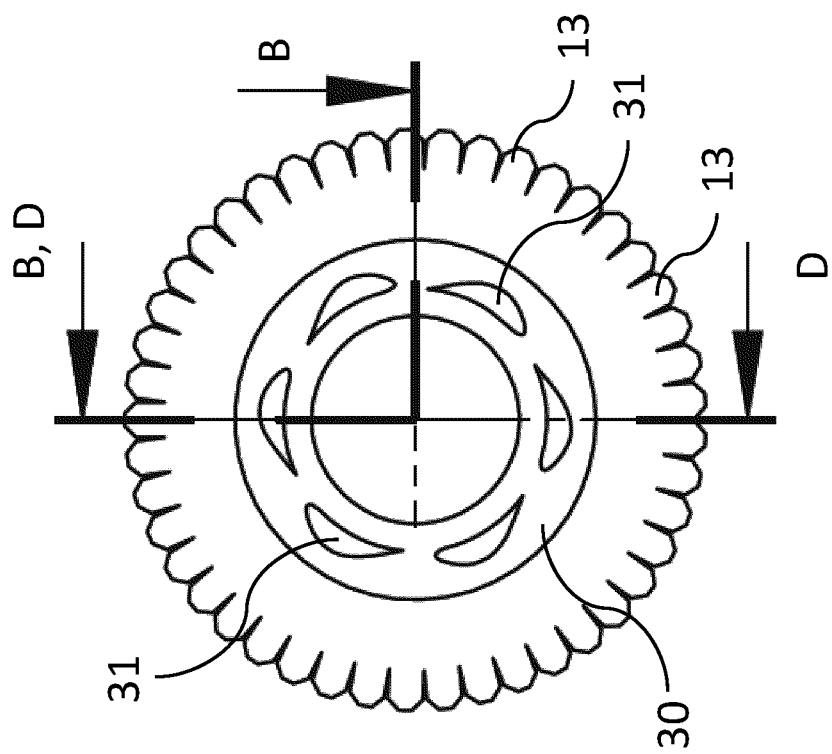
FIG. 1D is a schematic side view of the tyre.

FIG. 1D is a side view of the tyre 1. On the other hand, FIG. 1E is a composite cross-section following the line B-B marked in FIG. 1D, from the top of FIG. 1D to the centre of the tyre 1, and then from the centre of the tyre 1 to the right of FIG. 1D.

Referring to FIGS. 1D and 1E, it can be seen that the surface section 12 are the radially-distal ends of protrusions 13, which may also be described as rods. The radially-proximal ends of the protrusions 13 extend outward from an inner body of the tyre 1 that, in this embodiment, includes a tread interface 14 of the tread layer 10, as well as the linking layer 30 and the wheel interface 20.

The protrusions 13 have a length d which is a substantial portion of the radius r of the tyre 1 (dimensions labelled in FIG. 1E), greater than the depth of a conventional tread (8 mm when new) and usually at least 15 mm to 20 mm. In some examples, the protrusion length may be large enough that $r \leq 10d$, i.e. the protrusions have a length of at least 10% of the tyre radius, or even $r \leq 4d$, i.e. the protrusions have a length of at least 25% of the tyre radius. This large length d of the protrusions 13 means that the inner body is further from the road than in a conventional tyre and, among other advantages, has the effect that a risk of a ground surface, or object on the ground surface, piercing into the inner body is significantly reduced. Accordingly, in embodiments where the tread of the invention is combined with internal gas cushioning (e.g. an inner tube or an insert of the type described below), then a chance of decompression or sudden blowout is reduced, and safety and control are improved.

Each of the protrusions 13 can bend along their length, when a force is applied either due to friction between the ground surface and the tyre 1 or due to the presence of loose material or water. This bending translates into motion of the corresponding surface section 12 in the circumferential direction around the tyre (which may be, in use, parallel to the direction of motion of the vehicle) or motion of the corresponding surface section 12 in the axial direction (in use, perpendicular to the direction of motion of the vehicle).

By bending in combinations of the circumferential direction and the axial direction, the protrusions 13, and by extension the tyre 1, can conform to an uneven ground surface and maintain maximum traction. Additionally, when the ground surface is wet or includes loose material, forces at the edges of the surface sections 12 or slipping of individual surface sections 12 will create grooves for water or loose material to be expelled from between the tyre 1 and the ground surface, in order to maintain maximum grip and contact area with the ground surface. Due to the two possible directions of bending of the protrusions 13, these grooves may extend parallel to the direction of motion (as in conventional tyres with fixed grooves) or may extend perpendicular to the direction of motion.

The length d of the protrusions 13 may be chosen according to the application of the tyre.

For example, a tyre 1 which is expected to travel over rocky terrain may have a large length d, so that the protrusions 13 can bend a large distance over their length, and conform around relatively large objects in the uneven ground surface. Nevertheless, unlike a conventional tyre with large tread grooves for grip, the tyre 1 of the embodiment can be driven back onto a smooth surface (such as a road) and, once the protrusions 13 return to their unbent configuration, the tyre 1 will have a large surface contact that is not limited by fixed grooves.

Similarly, a tyre 1 which is expected to travel at high speeds may have a large length d, so that the protrusions 13 have less overall stiffness, and the surface sections 12 can move more quickly in response to changes in the ground surface. Additionally, the temperatures of the surface sections 12 will generally increase a high speeds, leading to an expansion and increased rigidity of the material from which the protrusions 13 are formed. This will shorten and stiffen the protrusions in use, meaning that a tyre 1 expected to go at high speeds may advantageously be designed to be less stiff prior to use (for example by including longer protrusions), with the expectation that stiffness will increase in use.

The protrusions 13, and more generally the tread layer 10 may be formed by any known methods for forming rubber or another suitable viscoelastic or elastic material, including synthetic rubbers. For example, the tread layer 10 may be formed by moulding and curing, by compacting recycled material, and/or by stamping or cutting. Certain manufacturing techniques may impose a minimum length of the protrusions 13—for example, if the protrusions 13 are moulded, they will need to be long enough to allow for release from the mould.

Referring again to FIGS. 1D and 1E, the linking layer 30 connects the tread interface 14 of the tread layer 10 to the wheel interface 20. Unlike a conventional tyre where the inner volume is largely taken up by an inner tube, the linking layer 30 is made from a solid super elastic material containing at least one cavity 31. The super elastic material is a material with a higher elasticity than a material of the tread layer 10. The super elastic material may for example comprise viscoelastic (uncured) rubber wherein the material inherently confers super elasticity, a wire frame wherein the structure of the frame confers super elasticity, or a combination of inherently and structurally elastic materials such as a wire frame embedded in rubber.

When the tyre 1 is put in position on a wheel of a vehicle, the linking layer 30 and wheel interface 20 provide a largely contiguous connection between the wheel and the tread layer 10. This provides better transfer of torque from the wheel to the tread than the side wall of a conventional tyre, and does not compromise traction efficiency to keep the tyre attached to the wheel unlike a conventional tyre with an inner tube. Additionally, the improved transfer of torque means that the body of the tyre is less stretched in use between the wheel interface and the tread layer, by comparison to a conventional tyre, and experiences less elastic fatigue.

Replacing a conventional inner tube with the linking layer 30 also means that the tyre 1 is heavier than a conventional tyre, which helps to increase traction of the tyre and control of the vehicle on which it is used.

As shown in FIG. 1D, the cavity 31 extends through the axial width of the tyre 1 and thus can be in fluid communication with an external environment of the tyre (e.g. ambient air) at either or both of the axial ends of the tyre 1. The presence of the cavity 31 allows the super elastic of the linking layer 30 to be compressed further, and thus dampen transfer of vibration from an uneven ground surface to the vehicle, similarly to the purpose of an inner tube in a conventional tyre. However, by eliminating the need for a pressurised gas in the tyre and eliminating the corresponding risk of depressurisation or blowout, safety and control are improved.

The cavity may have various cross-sectional shapes such as the inverted aerofoil-like shape shown in FIG. 1D, adapted to in a sense provide an outward lift for the tyre 1 as pressure flows around the wheel with its rotation. Alternatively, a simpler circular or half-moon shape still would allow for increased compression of the linking layer 30. The cavity shape can be optimised to maintain balance and smoothness on rotation.

In some embodiments, the cavity 31 may be provided with a compressible gas-filled cushion adapted to fit the cavity. Such a cushion has the effect of reducing friction between the walls of the cavity as the cavity is distorted when the wheel rotates, increasing the lifetime of the linking layer 30. The cushion works in tandem with the super elastic material of the linking layer 30 to dampen vibration, as a hybrid of the conventional tyre approach and the super elastic linking of the present invention.

The cushion may be filled with air, nitrogen, or another gas, and a pressure and material (or molar mass) of the gas in the cushion is matched to the choice of super elastic material in order to optimise durability, torque transfer and vibration suppression of the linking layer 30. For example, nitrogen has a lower molar mass (14) than ambient air (28.8), and may be chosen when it is desirable to minimize weight of the tyre while maximising the pressure in the cushion, as may be required for rougher ground surfaces or high speeds.

In embodiments having a cushion, it is desirable to provide multiple cavities 31 with respective separate cushions, such that a depressurization cannot affect the whole tyre at once-in the embodiment shown in FIG. 1D, six cavities 31 are arranged symmetrically around the tyre 1. Multiple cavities 31 may also be used even when no cushions are included, in order to more evenly spread the effect of the cavity around the wheel, and provide smoother rolling of the tyre.

The linking layer 30 may be attached to the tread layer 10 in various ways including mechanical interference, an adhesive, or by applying curing, heat and/or pressure. Alternatively, the linking layer 30 and the tread layer 10 may be moulded from a single super elastic material, although this would require a compromise between durability of the material that makes contact with the ground surface and elasticity of the linking layer 30, and therefore may be preferably avoided.

Furthermore, in a traditional carcass and inner tube configuration, the side walls of a tyre are curved, and the tread layer 10 must be formed directly on to the curved carcass. On the other hand, the side walls of the linking layer 30 can be flat such that the tread layer 10 can be simply arranged around the radius of the linking layer.

In particular, in a conventional method of manufacturing a tyre, a tread layer must be cured directly onto an inner carcass. Similarly, in a conventional method of re-treading a tyre, a new tread layer must be cured directly onto a recycled carcass, This means that curing of the tread, a slow stage of production, can only be performed as a later stage of assembling the tyre and the curing is complicated by the presence of the carcass.

On the other hand, according to the invention, a tread layer 10 can be fully formed before it is attached to a linking layer 30, and any required earlier curing stage can be a simple process of curing the tread layer 10 alone.

FIG. 2 is a schematic cross-sectional illustration of a tyre according to a second example embodiment. The position of the cross-section corresponds to the line D-D marked in FIG. 1D. This embodiment is similar to the embodiment described above by reference to FIGS. 1A to 1E, except that the tyre 1 additionally comprises connecting walls 40 fitted to the axial ends of the tyre 1.

The connecting walls 40 may be arranged to cover and protect the linking layer 30. More specifically, the connecting walls 40 may be arranged to cover an end of the one or more cavities 31, and thereby prevent debris from entering the cavity 31 and/or prevent a gas-filled cushion (where present) from escaping from the cavity 31. In order to provide this protection, it is not necessary that the connecting walls 40 seal the cavities 31, and the cavities 31 may nevertheless be in fluid contact with the external environment, as described above for the first embodiment.

The connecting walls 40 may simultaneously, in use, protect a wheel to which the tyre is attached, as an alternative to a hubcap. Specifically, the connecting wall 40 may be shaped to increase airflow over calliper, disc and brake parts while reducing water spray.

The connecting walls 40 may have a variety of shapes, including a solid disc or a ventilated disc with one or more holes to allow air flow through to a wheel to which the tyre is attached and/or to the linking layer 30.

Figure 3:
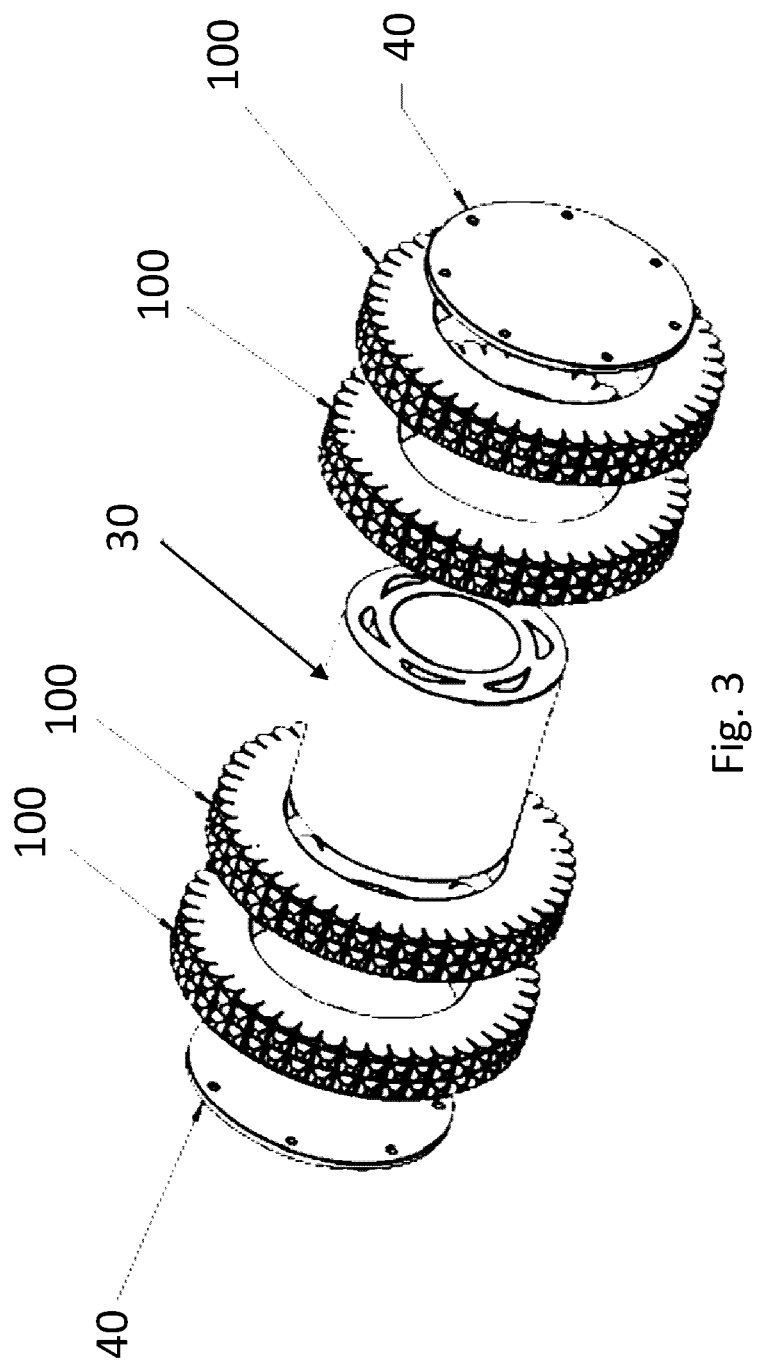
FIG. 3 is a schematic exploded view of a tyre according to a third embodiment.

The connecting walls 40 may be moulded as part of the tread layer 10 or the linking layer 30, and made of the same material as the associated layer. Alternatively, the connecting walls 40 may be separate elements which are detachable from the rest of the tyre 1. For example, the connecting walls 40 may be adapted to engage with an end of the one or more cavities 31, or may comprise one or more through holes for fasteners to engage with the linking layer 30 (as shown in FIG. 3). By making the connecting wall 40 detachable by design, a gas-filled cushion in a cavity 31 can be easily replaced in the event that it is pierced or degrades naturally.

The connecting walls 40 may also comprise a mounting portion for mounting the tyre 1 on a wheel hub. This fixed attachment between the tyre and wheel hub has the advantage of improving safety by preventing the tyre from detaching from the wheel in the event of a sideways impact on the tyre 1.

In the above example, the protrusions 13 are arranged in a grid around the whole circumference and axial width of the tyre 1. However, in other embodiments, a hybrid tyre may comprise a mixture of a conventional tread and a modified tread according to the above embodiment. For example, across the axial width of the tyre, the outer portions of the tread may be as described above, while a central portion of the tread may be smooth as in a conventional dry tyre. In this case, the smooth central portion can increase the contact area of the tyre, while the outer sections can maintain some traction in wet conditions. A mixture of conventional tread and tread according to the above embodiment may partly increase traction, decrease wear, and/or increase adaptability by comparison to a conventional tyre, without incurring the full cost of an improved tyre that is entirely according to the above embodiment.

Furthermore, the moveable surface sections 12 can be achieved by means other than protrusions 13. For example, the adaptive tread may comprise a continuous surface containing different sections with different elasticity. Sections of higher stiffness may correspond to the surface sections 12 of the above-described embodiment, while sections of lower stiffness may stretch to provide adaptive spacing between the surface sections 12, as an alternative to the bending protrusions described above. If the difference in elasticity is large enough, the lower-stiffness sections may form grooves to behave similarly to the above-described embodiment.

Furthermore, rather than relying on purely passive bending of protrusions or differences in elasticity, an adaptive tread may be actively controlled using, for example, dielectric elastomer sections and control circuitry applying a voltage to the dielectric elastomer sections. This may be used with either of the above alternatives, either by varying the elasticity (bendability) of the protrusions 13 in the illustrated embodiment, or by varying the elasticity of the lower-stiffness sections in the alternative example.

The above-described tread layer 10 can be used without being combined with the above-described linking layer 30. The protrusions 13 of the tread layer 10 may be implemented for an otherwise conventional tyre, such as a tyre having an inner tube.

Similarly, the above-described linking layer 30 can be used without being combined with the above-described tread layer 10. The super elastic linking layer 30 may be used in a tyre with a conventional tread.

Although the above-described second embodiment includes two connecting walls, the advantages of the connecting wall 40 may be provided on only one axial end of the tyre 1. For example, referring to a position of the tyre when used in a vehicle, the connecting wall 40 may be provided to protect an inner side of the tyre, while a conventional wheel hubcap may be relied upon to provide partially-similar protection on an outer side of the tyre.

FIG. 3 is a schematic exploded view of a tyre according to a third embodiment. The third embodiment differs from the second embodiment in that the tread layer 10 comprises a plurality of disc sections 100.

Each disc section 100 may be similar to the tread layer 10 as described above. However, the linking layer 30 of the third embodiment has a greater length in the axial (z) direction than one disc section 100, and the plurality of disc sections 100 are arranged around and along the linking layer 30. In other words, the tread layer 10 of the second embodiment is divided in the axial direction into the plurality of disc sections 100 of the third embodiment.

Each disc section 100 may be adapted to interlock with an adjacent disc section 100. For example, each disc section 100 may comprise one or more sockets or protrusions in the axial direction which fit together. This may reduce shear forces on the attachment between the disc sections 100 and the linking layer 30. Alternatively, disc sections 100 may be bonded together by various means such as vulcanisation, application of heat or pressure, or using adhesives.

With the above configuration, a complex tread layer 10 can be assembled in a modular fashion by combining disc sections 100 with different tread patterns. For example, the inner (second and third) tread sections may comprise a conventional tread pattern, and the outer (first and fourth) tread sections may comprise adaptive tread 11 as described above. More generally, pre-fabricated disc sections 100 can be combined to form any combination of tread patterns.

Furthermore, disc sections 100 can be combined to form a tyre of any overall width, when assembled with a corresponding linking layer 30. This means that a single type of disc section 100 can be used to produce tyres of different widths.

FIG. 4 is a schematic cross-section view of a tyre according to a fourth embodiment. The fourth embodiment differs from the third embodiment in that the tread layer 10 comprises spacers 50 arranged between pairs of adjacent disc sections 100.

The spacers 50 are tread sections with a lower radius than the disc sections 100, and are configured to define a spacing between disc sections 100 in the axial direction.

The spacers 50 may also be configured to interlock with the adjacent disc sections 100.

As shown in FIG. 4, different spacers 50 may have different radii and may define different spacings between disc sections 100. The radii and spacings may be optimised according to an expected load and expected road conditions for the tyre.

For example, in winter conditions, an increased spacing between disc sections 100 may be used, as an equivalent to using multiple narrow tyres or snow chains, in order to provide increased traction. Similarly, in summer, increased spacing between disc sections may increase ventilation and reduce the operating temperature of the tyre surface, or may decrease the chance of aquaplaning.

The invention claimed is:

1. A tyre comprising an adaptive tread, the adaptive tread comprising a plurality of surface sections, wherein each surface section can move without deformation relative to other surface sections to form a tread pattern;
   the tyre comprising an inner body and a plurality of protrusions, the plurality of protrusions being arranged around a circumference of the inner body and extending radially outward from the inner body,
   wherein each of the plurality of surface sections is a radially-distal end of a protrusion of the plurality of protrusions;
   wherein the inner body comprises a tread interface, a wheel interface and linking layer arranged to link the wheel interface to the tread interface;
   wherein the linking layer is formed from a super elastic material and comprises a cavity;
   wherein the super elastic material has a higher elasticity than the adaptive tread;
   wherein each protrusion in the plurality of protrusions has a radial length of at least 10% of a radius of the tyre.

2. A tyre according to claim 1, wherein a middle portion of each of the plurality of surface sections is raised relative to an edge portion of each of the plurality of surface sections, for directing water or loose material towards the edge portion.

3. A tyre according to claim 1, wherein the cavity is in fluid connection with an external environment of the tyre.

4. A tyre according to claim 1, wherein the linking layer comprises a plurality of cavities distributed around a circumference of the tyre.

5. A tyre according to claim 1, wherein a tread layer comprises a plurality of disc sections arranged around the linking layer and along a rotation axis of the tyre.

6. A tyre according to claim 5, wherein a spacer is arranged between a pair of adjacent disc sections.

7. An electric vehicle comprising a tyre according to claim 1.

8. A tyre according to claim 1, wherein the super elastic material comprises viscoelastic rubber.

9. A tyre according to claim 1, wherein the super elastic material comprises a wire frame embedded in rubber.

10. A tyre according to claim 1, wherein the plurality of protrusions is arranged in rows extending along an axial width of the tyre.

11. A tyre according to claim 4, wherein each row comprises a plurality of adjacent protrusions.

12. A tyre according to claim 1, further comprising a compressible gas-filled cushion adapted to fit the cavity.

13. A tyre according to claim 12, wherein the compressible gas-filled cushion comprises nitrogen.

14. A tyre according to claim 1, further comprising a connecting wall fitted to an axial end of the tyre, the connecting wall covering the linking layer.

15. A tyre according to claim 14, wherein the connecting wall comprises a mounting portion for mounting the tyre on a wheel hub.

16. A tyre according to claim 14, wherein the cavity extends to the axial end of the tyre, and the connecting wall covers the cavity.

17. A tyre according to claim 16, wherein the connecting wall is detachable from the tyre.

18. A method for assembling a plurality of tyres, wherein each tyre comprises:
an adaptive tread, the adaptive tread comprising a plurality of surface sections; each surface section can move without deformation relative to other surface sections to form a tread pattern; the tyre comprising an inner body and a plurality of protrusions being arranged around a circumference of the inner body and extending radially outward from the inner body, wherein each of the plurality of surface sections is a radially-distal end of a protrusion of the plurality of protrusions; wherein the inner body comprising a tread interface, a wheel interface and a linking layer arranged to link the wheel interface to the tread interface; and the linking layer is formed from a super elastic material and comprises a cavity, and wherein the super elastic material has a higher elasticity than the adaptive tread, wherein each protrusion of the plurality of protrusions has a radial length of at least 10% of a radius of the plurality of tyres, the method comprising:

manufacturing the linking layers of the plurality of tyres;

manufacturing the tread layers of the plurality of tyres; and assembling the plurality of tyres by arranging a corresponding tread layer of the tread layers around a corresponding linking layer of the linking layers.

* * * * *